Aug. 14, 1973

G. R. FITTERER 3,752,753

METHOD OF FABRICATING A SENSOR FOR THE DETERMINATION OF
THE OXYGEN CONTENT OF LIQUID METALS

Filed April 30, 1971

United States Patent Office 3,752,753
Patented Aug. 14, 1973

3,752,753
METHOD OF FABRICATING A SENSOR FOR THE DETERMINATION OF THE OXYGEN CONTENT OF LIQUID METALS
George R. Fitterer, 825 12th St., Oakmont, Pa. 15139
Continuation-in-part of application Ser. No. 786,866, Dec. 23, 1968, which is a continuation-in-part of application Ser. No. 570,855, Aug. 8, 1966, now abandoned. This application Apr. 30, 1971, Ser. No. 139,018
Int. Cl. G01n 27/46
U.S. Cl. 204—195 S
22 Claims

ABSTRACT OF THE DISCLOSURE

A method for fabricating a direct reading oxygen probe structure for insertion into high temperature liquid metal comprises the steps of inserting a relatively closely fitting mass of an electrolyte material into one end of an insulating envelope, and heating the envelope to a sintering temperature of the mass at a temperature and time interval sufficient to sinter and seal the mass to the envelope. Desirably, the envelope and mass are sized and shaped so as to be capable of withstanding thermal shock upon contacting the liquid metal.

---

This application is a continuation-in-part of my copending application entitled Determining Oxygen Content of Material, Ser. No. 786,866 filed Dec. 23, 1968, now Pat. No. 3,619,381, which in turn is a continuation-in-part of my then copending application, Ser. No. 570,855, filed Aug. 8, 1966, now abandoned.

The present invention relates to methods and means for the direct determination of the oxygen content of various materials, and more particularly to means and methods for the substantially instantaneous determination of oxygen in liquid metals and other materials maintained at elevated temperatures, for example, molten steel. Certain arrangements of the invention are adapted for use with conductive and non-conductive materials, respectively, particularly at elevated temperatures.

There are many applications throughout industry wherein it is necessary to ascertain the oxygen content of various materials. However, in order for such information to be useful in many manufacturing processes, it is essential that the oxygen analyses be timely made to permit corrective adjustment of manufacturing processes. In the case of liquid steels and other high-temperature liquid metals, various methods have long been used for the sampling and analysis of their oxygen contents. In the manufacture of rimming steel, certain high quality steels, and other metals which are melted at high temperatures, it is essential that the quantity of oxygen or other gas dissolved in the steel be closely controlled. In various liquid metal processes, a technique for continuously monitoring the dissolved oxygen content is sorely needed, particularly for those high temperature liquid metals maintained at 800° C. or 1000° C. and higher. In all of the analytical methods developed previously, however, it has been necessary to extract a sample of the molten steel or other liquid metal or alloy from the ladle or from the furnace as the case may be. The sample then is carried elsewhere for analysis, for example, by vacuum fusion procedures.

The analysis made in the foregoing manner is time-consuming, in addition to involving considerable labor costs, and does not provide an up-to-the-minute picture or analysis of gas content in the molten material during the manufacturing process. Therefore, corrective measures have to be delayed until the analysis becomes available from the laboratory. In consequence, such corrective measures usually are ineffective or at best serve merely to provide background or post-mortem information relative to succeeding heats, batches, or melts.

These difficulties are overcome by my disclosed direct-determination apparatus and methods which involve the insertion of a probe into a high temperature material such as molten steel or other liquid metal. In the case of liquid steels or the like, means are afforded for penetrating any overlying slag without affecting the reading. Upon contact with the liquid metal or other material, the probe through suitable electric circuitry yields an indication of the oxygen content substantially at the instant of insertion. In one arrangement of my apparatus, liquid metal or other high temperature material can be brought into contact with a solid electrolytic cell of specialized construction, when the probe is inserted therein. Such contact is established in a manner so as to expose the electrolytic cell to the material having an unknown oxygen content, without either oxidation or deoxidation of the sample by contact with extraneous materials. The resultant electromotive force generated by the cell when contacted with the material is found to vary in direct proportion to the dissolved or uncombined oxygen content of the molten metal. A suitable calibration can be readily established to relate oxygen content to the EMF value, depending upon temperature and the characteristic oxygen pressure developed by the reference material inside the probe. The EMF is a function of the ratio of the oxygen pressure of the oxygen dissolved in the metal and the oxygen pressure exhibited by the reference material at the temperature of insertion.

In either case, the substantially instantaneous analysis of the oxygen content in the molten metal or other material at elevated temperatures is completed in a few seconds after the probe is inserted. Thus, useful manufacturing information can be obtained even where the oxygen level is changing rapidly. On the other hand, with previous analytical techniques, the values of oxygen content, even if accurate, would be useless insofar as that particular batch or heat would be concerned.

Most importantly, my apparatus is capable of being plunged into molten steel or other materials maintained at extremely high temperatures without fracturing or otherwise suffering destructive thermal shock. A measurement of the dissolved oxygen content is obtained, owing to the novel construction of my apparatus, at a predetermined point or location within the bath of molten steel or the like. Previous apparatus for this purpose have been subject to fracturing or other thermal shock when plunged into molten steel. Prior oxygen measuring devices used closed-end elongated tubes which were entirely composed of a stabilized solid oxygen ion conducting electrolyte which in this form is not resistant to thermal shock.

The structural and technical disadvantages of the prior art which have been noted during the preceding discussion are illustrated by the United States patents to Hickam No. 3,347,767; Alcock No. 3,297,551; McPheeters et al. No. 3,309,233; Kolodney et al. No. 3,378,478; and Fischer No. 3,359,188. Each of these patents contemplates the provision of an elongated tube made from a solid electrolyte material. This representative sampling of the prior art emphasizes the inability of prior devices to measure the dissolved oxygen content of liquid metals without exceptionally slow preheating. That the relatively large electrolyte tube is subject to thermal shock is abundantly illustrated by Kolodney et al. who provided a surrounding mesh basket for collecting pieces of the electrolyte tube upon fragmentation. These references further represent the difficulty of suitable insulating the walls of the electrolyte tube from its holder to prevent shorts in the electric circuit.

My apparatus, on the other hand, employs a probe using a relatively small mass of solid electrolyte, supported in the end of an elongated, insulating tube. The assembly thus formed is highly resistant to thermal shock, and only a very small area of the electrolyte is exposed to the high temperature material being measured.

A number of laboratory instruments for the direct measurement of oxygen have also been proposed from time to time. These are typified by Horsley, AERA Report R3427 pp. 1–6 and FIG. 2, 1961. An electrolyte disc is sandwiched between two cermet electrodes for the purpose of measuring the free energy in the cermets. The sandwich is held together by a pair of tubes, an additional purpose of each of which is to supply a controlled, inert atmosphere respectively to the outward surfaces of the cermets. Further, the cermet discs are separated from the supporting tubes by nickel discs or foils. If the lower supporting tube of the Horsley device were removed, the entire assembly would, of course, fall apart. Obviously, there is no teaching of submerging the Horsley device in a liquid material particularly in a high temperature liquid material. Similarly, there is no teaching of securing a small mass or pellet of solid electrolyte material in the end of a supporting and insulating tube.

Similar apparatus for the direct measurement of oxygen is described in the literature, representative references to which are tabulated below:

(1) K. Kiukkola and C. Wagner: J. Electrochemical Soc., 104, 397, 1957.
(2) H. Schmalzried: z. f. Physicalische Chemie NF, 25, 178, 1960.
(3) C. B. Alcock and T. N. Belford, Trans. Faraday Soc., 60, 822, 1964.
(4) W. Pluschkell and H. Engel: J. Metallkunde, 56, (7), 450, 1965.
(5) W. A. Fisher and W. Ackermann: Arch. f.d. Eisenhuttenw 36, 643, 1965.
(6) M. Kolodney, B. Minushkin, and H. Steimnetz: Electrochem. Tech., 3, (9–10), 244, 1965.
(7) Y. Matsushita and Goto: Thermodynamics IAEA (Vienna), 1, 1966.
(8) T. C. Wilder: Trans Met. Soc. AIME, 236, 1035, 1966.
(9) R. Baker and J. M. West: J. British Iron & Steel Inst., 204, 212, 1966.
(10) E. T. Turkdogen and R. E. Fruehan: 76th General Meeting AISI, May 1968.

In certain forms of my novel direct measurement apparatus, the probe structure can be enclosed with a self-contained oxygen-based reference material therein. This avoids the necessity of conducting air or other oxygen-containing material into the probe structure from an external source during use of the probe.

I accomplish the desirable results described heretofore and overcome the defects of the prior art by providing a method for fabricating a direct reading oxygen probe structure for use in a high temperature liquid metal, said method comprising the steps of inserting a relatively closely fitting mass of an electrolyte material into one end of an insulating tubular envelope, and heating said envelope at a sintering temperature of said mass for a time sufficient to sinter and seal said mass to said envelope.

I also desirably provide a similar method including the modified steps of inserting said mass in pulverulent form into said envelope, and heating said envelope to sinter particles of said mass to one another and to sinter the outer periphery of said mass to the adjacent surfaces of said envelope.

I also desirably provide a similar method wherein said envelope is fabricated from one of the group consisting of alumina, fused silica, and fused quartz.

I also desirably provide a similar method wherein said electrolyte is fabricated from at least one of the group consisting of a zirconia and thoria stabilized with calcia or yttria.

I also desirably provide a similar method including the modified step of heating said envelope to a softening temperature thereof within the sintering temperature range of said mass.

I also desirably provide a similar method as modified for use of said probe structure, said method including the additional steps of placing a metallic oxygen reference material within said envelope against said mass, pressing said reference into contact with said mass, and establishing an electrical circuit through said reference and said mass.

I also desirably provide a method of fabricating a direct reading oxygen probe structure and for using the same to measure the dissolved oxygen concentration of a high temperature liquid metal, said method comprising the steps of sealing an oxygen-anion permeable solid electrolyte mass into an end portion of an electrically insulating envelope to form a probe, sealing said probe into a wall of a mold structure so that said probe extends thereinto, pouring a quantity of said high temperature liquid metal into said mold structure to contact said mass therewith, measuring the EMF developed across said mass for correlation with said dissolved oxygen content, and measuring the temperature of said liquid metal for correlation with said EMF.

I also desirably provide a similar method including the modified step of measuring said temperature when the latter becomes essentially constant to correlate the melting point of said liquid metal to the EMF of the probe and thus the oxygen content of said metal.

These and other objects, features, and advantages of the invention, together with structural details thereof, will be elaborated upon as the following description of presently preferred embodiments and presently preferred methods of practicing the same proceeds.

In the accompanying drawings, I have shown presently preferred embodiments of the invention and have illustrated presently preferred methods of practicing the same, wherein:

FIG. 9 is a partial cross sectional view of still another form of my direct oxygen measuring apparatus shown in a unique arrangement with a continuous casting machine or the like;

Figure 1:
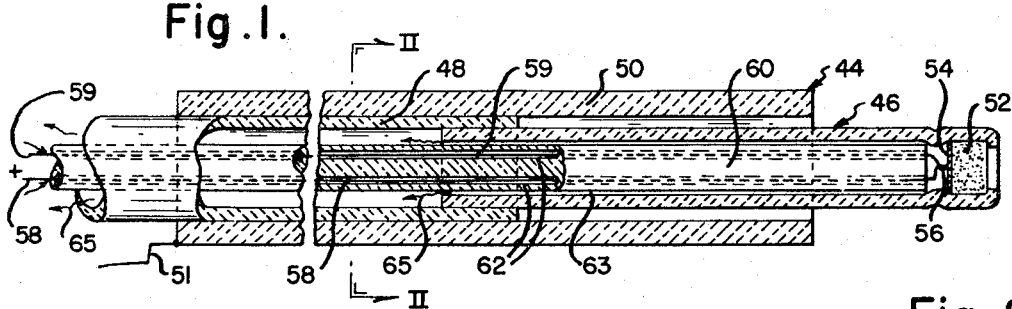
FIG. 1 is a longitudinally sectioned view of one form of probe structure arranged in accordance with the invention.
Figure 2:
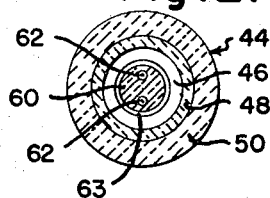
FIG. 2 is a cross sectional view of the probe structure shown in FIG. 1 and taken along reference line II—II thereof.

Referring now to FIGS. 1–2 of the drawings, the illustrative form of the probe structure 44 shown therein includes an envelope 46 fabricated from fused silica, alumina, or fused quartz or the like electrically insulating material which is sufficiently refractory and chemically resistant to withstand molten metal or other high temperature material for an interval at least sufficient to permit a reading to be made. In the case of molten steel analyses, fused silica or quartz is preferred. Fused silica has a melting point of about 1710° C. and begins to soften at a temperature of about 1650° C., which is higher than that of most liquid steels during refining. In any event, slight softening of the envelope 46 does not interfere with the reading, which is substantially instantaneous. Moreover, a rapid heating of the envelope to an elevated temperature, particularly one in the vicinity of its softening temperature, prevents cracking of the envelope by the mass 52 (described below), which may have a considerably higher coefficient of expansion. The relatively small sizes of the envelope 46 and mass 52 also mitigate the effects of their differing rates of thermal expansion. Proper selection of refractory materials is important since the probe may be used in liquid metals at elevated temperatures above 1000° C. to include the complete range of melting temperatures of the wide variety of liquid steels, and other high temperature liquid metals, such as molten copper. More critically, in the case of certain electrolyte materials useful herein, a significant oxygen-ion conductance does not occur until a temperature of about 800° C. is attained.

This envelope 46 in this example is retained in a length of iron tubing 48 or other suitable support, on the outer surface of which is supported an electrode 50, which is fabricated from an electrically conductive material capable of withstanding molten metal at elevated temperatures. The electrode 50, if desired, can be separated from the probe structure for independent insertion into the liquid metal. Of course, the iron tubing 48 itself can serve as the external electrode in place of the electrode 50. In any event, the electrode 50 can be shaped for coinsertion with the probe 44 to a predetermined depth in the liquid metal. Examples of such coinsertion are evident from FIGS. 9, 10, and 11 described below.

At the outward end of the envelope 46, a mass 52 of solid electrolyte material, such as one of the solid electrolytes described below, is retained as by melting or heat-forming the walls of the envelope 46 about the mass 52 or by sintering the mass 52 (in either pellet or pulverulent form) to the adjacent internal wall surfaces of the envelope 46 without appreciable forming of the envelope, as noted below. For maximum thermal resistance the mass 52, in any case, is of small size and compact of configuration, as evident from the drawings, particularly FIG. 3 (enlarged as aforesaid). A desirable configuration for the mass 52, as evident from FIGS. 1 and 3 and from FIGS. 5–7, 10 and 11, is right-cylindrical wherein the diameter and height of the cylinder are about equal. For operation of the probe, it is necessary only that the mass 52 be sealed to the envelope 46, to an extent to prevent leakage of liquid metal into or gas out of the probe.

In this example, a very reliable seal is produced as by heat-forming the envelope material about the mass 52. Heat-forming of the envelope can be accomplished by spinning or rotating the envelope about its longitudinal axis while heating at least that portion thereof adjacent the mass 52 to the softening point of the envelope material.

The seal results from a sintering action which inherently occurs when solid electrolyte and envelope materials of comparable sintering and softening temperature ranges are employed. For example, a zirconia-calcia mass 52 (or an electrolyte of similar melting point such as yttria-stabilized thoria) has a sintering temperature range of about 2300° F. to 3250° F. and is inherently sintered to a fused silica envelope having a softening point of about 3000–3100° F. Sintering occurs between the electrolyte mass 52 and the adjacent surface of the silica envelope to form an excellent ceramic-to-ceramic seal. In addition, individual particles of the mass 52 are sintered or resintered, as the case may be, to one another for increased strength and reduced porosity of the electrolyte mass 52. The probe 44 is highly resistant to thermal shock.

In one arrangement, the mass 52 can be provided in the form of a discrete pellet or disc to which the walls of the envelope 46 can be shaped thereabout, as shown in FIG. 1; or alternatively the pellet can be inserted into a length of tubing 46' (FIG. 3) made of the aforementioned insulating materials and having about the same inner diameter as the outer diameter of the mass 52'. In the latter case, the adjacent wall positions of the envelope 46' can be heat-formed and spun upon the outer cylindrical periphery of the pellet 52' to form a seal therewith, as noted above.

In forming a powdered zirconia-containing electrolyte into a special shape, such as the mass or disc 52 in the end of the envelope 46, or other structure, such as the electrolyte insert of FIG. 12, I convert the powder into a paste or plastic mass by mixing it with the aforesaid agglutinants. Certain polymers, such as polyvinyl alcohol, carboxy methylcellulose and/or gum gatti in an aqueous solution, can also be used for this purpose. The agglutinant or binder aids in compacting the mass against the surface of the envelope, and thus improves the bond between the envelope and the electrolyte mass.

Zirconium citrate or other organic compounds of zirconium also can be used. Upon heating the mass, in situ, in an oxidizing atmosphere, the zirconium compound binder is decomposed and $ZrO_2$ is formed thus bonding the particles together. The mass then retains its shape when heated to high temperatures, such as in baking or sintering, or in subsequent use, and is rendered more impervious by this treatment.

The preparation of an oxygen sensor or probe which has a combination of chemical and physical properties for resisting destruction and malfunction when plunged into a high temperature liquid metal such as steel has been accomplished by at least two features of the invention which constitute essential bases for this invention.

The disclosed materials when combined not only jointly withstand extreme thermal shock without shattering but also do not decompose or melt. In addition, the combination resists erosion and destructive chemical reaction or other contamination by the liquid metal or its dissolved oxide during such immersion. Failure of the probe to comply with any of these stipulations will result in either malfunction or an erroneous indication of the oxygen content of the material.

Thus, a primary feature of the invention is a proper selection of the materials for the envelope and the electrolyte. For example, fused silica when selected from one of the envelope materials and calcia-stabilized zirconia when selected from one of the electrolytes exhibit these properties either individually or collectively in the proposed structure. A second primary feature involves a special sintering method for installing or inserting a mass of solid electrolyte into a fixed position at or near the end of a tubular envelope.

In this procedure, after certain preliminary steps depending upon whether a pellet or a powdered mass of electrolyte is being installed, the tip of the probe containing the electrolyte is heated to a temperature in the range of 2000° F. and preferably approaching 3000° F.

The selected materials are sufficiently compatible so that they interact to form a secure bond. In the case of the combination of calcia-stabilized zirconia and a silica tube, the CaO of the electrolyte reacts with the $SiO_2$ of the tube to form a calcium silicate interface, thus securely bonding the two materials. In the case of a probe structured with the calcia-stabilized zirconia in an alumina tube, for example, sintering results in a reaction between the CaO of the electrolyte and the $Al_2O_3$ of the tube to form an interfacial compound of a spinel configuration (CaAl₂O₄).

Rapid cooling from the sintering temperature tends to stabilize the high temperature configuration so that the thermal shock is greatly reduced when the probe is plunged into high temperature liquid metal.

Desirably, but not necessarily, the envelope material has a softening temperature range within the sintering range of the electrolyte material to facilitate sintering and sealing thereof to the envelope, as noted previously.

The envelope 46, together with the mass 52, is releasably held in the probe structure 44 so that this portion of the assembly can be discarded after one or more measurements. When using the probe 44, the forward surface of the mass 52 is exposed to the molten material through the otherwise open end of the envelope 46. Desirably the forward surface of the mass 52 is adjacent the associated end of the envelope as shown. In certain applications, however, the mass can project through the envelope opening. In most applications, on the other hand, the envelope opening, and in this case the I.D. of the tubular envelope, are kept small, as evident from FIG. 3, to reduce that surface of the mass 52 which must be exposed to the liquid metal.

As is well-known, the coefficients of thermal expansion of many of the electrolyte materials disclosed herein are larger than those of the noted envelope materials. In those applications wherein the electrolyte coefficient is substantially larger, the effects of differential thermal expansion can be mitigated, when necessary, by heating the envelope, during use of the probe, at a very rapid rate from its initial temperature to the elevated temperature of the liquid metal and preferably by selecting an envelope material which begins to soften at the elevated temperature. The envelope, then, becomes slightly plastic before sufficient heat penetrates the walls thereof to the electrolyte to cause appreciable thermal expansion of the latter.

Oxygen reference means can be placed in the envelope 46 or 46' and desirably against the apposed surface of the mass 52 or 52'. The reference means can take the form of a metal foil or coating 54 or other metal member as described below. A cermet member, or an alloy can also be used. Oxygen from suitable oxygen-reference means such as those described below, diffuses readily through the coating. In the case of pure iron, for example, reference oxygen quickly saturates the iron foil before an oxidation commences. In other arrangements of my invention, the coating is provided as a piece of foil or other discrete member pressed or held against the mass 52 for contact purposes. Reference oxygen can then pass around as well as through the contact member.

Although the coating 54 facilitates intimate contact between the mass 52 and an electrical connection such as thermocouple 56, the coating is not essential as pointed out below. The electrode coating can be replaced by a discrete electrically conductive member or mass held against the electrolyte member 52, for example, by the elongated member 60 mentioned below. The electrode coating or member 54 can be combined with or serve additionally as a solid oxygen reference means, as also noted below. The thermocouple 56, in this example, also provides an electrical connection to the opposite or other apposed surface of the mass 52 through one of its leads, for example, the lead 58. The other electrical connection can be provided by lead 51 and electrode 50, since the envelope 46 is of insulating material.

The thermocouple leads 58 and 59 are insulated and conducted through the envelope 46 to the thermocouple 56 by suitable means such as an apertured and elongated insulating member 60, fabricated like the envelope 46 from fused silica, alumina, quartz or the like. The insulating member 60 desirably is spacedly fitted within the envelope 48, and is provided with a pair of longitudinally extending, laterally spaced apertures 62 through which the thermocouple leads 58, 59 are loosely extended. The passages 62 therefore can provide access for external air or other oxygen-containing gas to the thermocouple side of the electrolyte disc 52. Desirably the member 60 presses the thermocouple 56 into good electrical and thermal contact with the mass 52, and with a discrete electrode and/or oxygen reference member when used. In this relation, the member 60 can be affixed after the teaching of FIG. 1, for example.

Other oxygen containing materials such as CO₂ or various cermets (and many other oxygen-bearing compounds some of which are noted hereinafter) can be used as oxygen-reference means. These materials dissociate at the elevated temperatures to which the probe usually is subjected as follows:

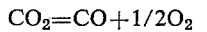
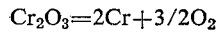
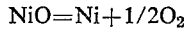

$$CO_2 = CO + 1/2 O_2$$
$$Cr_2O_3 = 2Cr + 3/2 O_2$$
$$NiO = Ni + 1/2 O_2$$

As such compounds have differing dissociation energies, the probe usually requires calibration for each such source of oxygen.

The aforementioned reference gas can be circulated inwardly through the rod apertures 62 to the inner surface of the pellet 52 and then outwardly through clearances 63 between the rod 60 and the envelope 46 as denoted by flow arrows 65. On the other hand, the rod 60 can be closely fitted within the envelope 46 and a central longitudinally extending baffle (not shown) can be utilized to circulate a reference gas forwardly through one of the passages 62 and in the return direction through the other passage 62.

Figure 6:
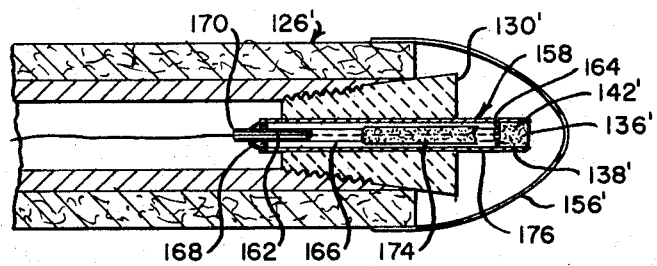
FIG. 6 is a similar view showing still another form of my novel probe structure with self-contained oxygen-reference means in a partially sealed probe structure.

It has been found that ready access of the inner surface of the solid electrolyte disc 52 to a standard oxygen-reference source is necessary in order to obtain a prompt reading of stabilized EMF output from the probe, when the molten material contacts both the mass 52 and the electrode 50. In one arrangement of my oxygen-reference means, a steady but not necessarily strong flow of reference gas is thus maintained. In fact, still air has been used as a reference material. It is contemplated that the quantity or concentration of oxygen available from the oxygen-reference means can be varied as noted below or by adding a quantity of nitrogen or other relatively inert gas, so as to shift the calibration curve of the electrolyte cell to another, more easily measured potential range (FIG. 6).

It will be understood, of course, that the use of the thermocouple 56, and one of its leads, such as the lead 59, are not essential to the operation of the probe structure 44 and can be omitted, particularly if other temperature measuring means are available. Upon omission, the lead 58 will be connected directly to the inner coating or the like of electrode member 54 of the electrolyte mass 52 in order to ensure the necessary electrical contact therewith. The aforementioned electrically conductive coating or member 54 is not essential, but is useful in facilitating electrical contact with the lead or leads 58, 59 by pressure contact for example. Also, one of the gas and conductor passages 62 can likewise be omitted and the aforementioned circulation of oxygen-bearing gas can be returned through the clearances 63. The leads can be of very small diameter, so as not to obstruct the flow of an oxygen-reference gas, when used.

The mass 52 is sufficiently small, in this example, that any differential expansion between the solid electrolyte material comprising the mass 52 and the material of the envelope 46 will not cause the latter to fracture. In fact, the small size of the probe structure does not interfere with the electro-chemical aspects of its operation, and the probe can be "miniaturized," if desired, to an extent consistent with manufacturing techniques.

Figure 3:
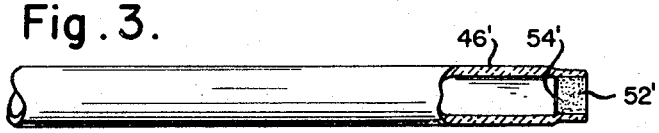
FIG. 3 is an enlarged elevational view, partially sectioned, of one form of the insulating envelope and electrolyte pellet arrangement which can be utilized in the probe structures of the invention.

A further advantage of the structure of FIGS. 1–3 lies in the fact that the size and shape of mass 52 considerably reduces the cost of manufacturing the probe structure 44, as compared to the case where the entire envelope 46 or a substantial portion thereof is fabricated from the solid electrolyte, which is a rather expensive material. The latter advantage is an important consideration in view of the fact that the electrolyte mass 52 and the envelope 46 in many applications must be replaced in the probe structure 44 after each reading particularly after insertion into high temperature liquid metals, such as molten steel. The expendable envelope 46 and mass 52 together represent a small fraction of the cost of fabricating the entire envelope from an electrolyte material. The latter envelope, even if it does not fracture from thermal shock, must also be expended after each use, which renders the cost thereof prohibitive for most applications.

Figure 4:
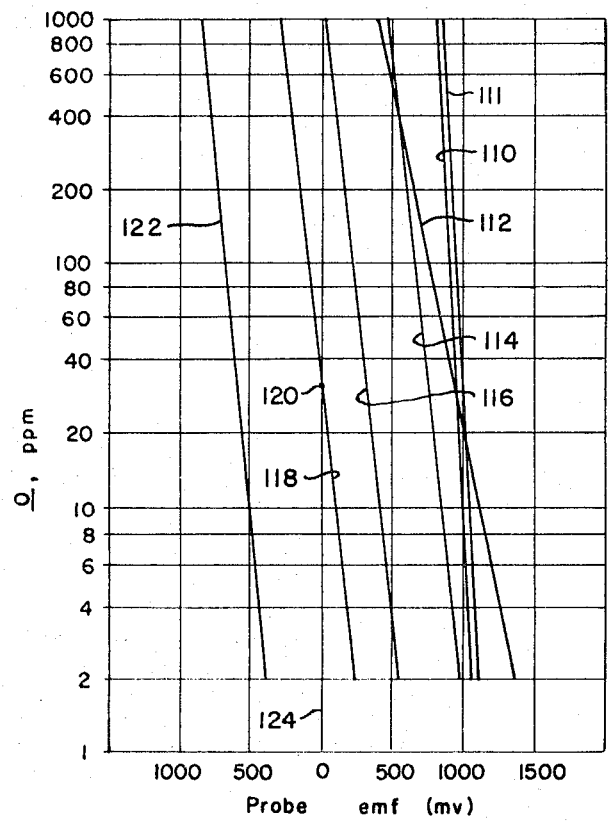
FIG. 4 is a graphical representation of the calibrated electrical output of my novel probe utilizing various types of oxygen-reference materials.
Figure 5:
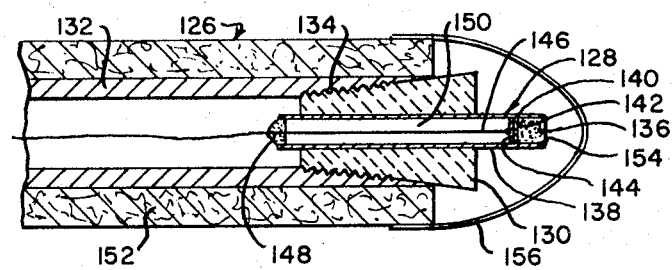
FIG. 5 is a partial, longitudinally sectioned view of still another form of my novel probe structure having self-contained oxygen-reference means.

Referring now to FIGS. 4 and 5 of the drawings, wherein similar reference characters with primed accents denote similar components of FIGS. 1 and 2, another probe structure 70, arranged in accordance with the invention, is illustrated. The latter arrangement is adapted particularly for determining oxygen content of a liquid metal in most refining furnaces, such as the open hearth, where it is necessary to protect the probe from contact with an overlying layer of molten slag thereon as the probe is immersed below the slag-metal interface. Thus, the probe structure 70 is provided with means for shielding the solid electrolyte from contact with the overlying slag layer and for quickly inserting the probe components into the molten bath in order to obtain a stabilized reading.

In furtherance of these purposes, the supporting envelope 44' together with the electrolyte mass 52' secured therewith are mounted in a plug member 72, through which the envelope 44' is extended centrally and longitudinally. The plug 72 is inserted into a central and longitudinally extending channel 74 of a tubular electrode 76 fabricated from a compatible material such as steel. Electrical contact to the tubular electrode 76 and to the electrolyte disc 52' is established by lead 51' and one of the thermocouple leads 58' or 59' as described above. An oxygen reference gas, such as air or $CO_2$ can be circulated to the inner surface of the disc 52' and/or the thermocouple 56' can be eliminated.

The electrolyte mass 52 or 52' desirably is fabricated from a suitable solid material which resists melting at any anticipated elevated temperature and exhibits solid electrolytic properties. In those applications involving the testing of molten steel, where high oxygen content with relatively low percentages of carbon, silicon, and alloying constituents are anticipated, the electrolyte mass can be made from zirconia stabilized with calcia, as noted above. In applications involving other high-melting liquid metals, stabilized zirconia or thoria, for example, can be used to advantage.

In general, combinations of oxides can be utilized which exhibit electrolytic properties by providing the necessary defects in the crystalline lattice which allow the transport of oxygen ions. Principal among these are partially saturated complex oxides, which otherwise conform generally to the spinel-type crystalline structure. Spinel type structures, for this purpose, are approximated by the generalized formula ($MN_2O_4$), which results from at least three different combinations, as set forth generally in the following Table I. The most common spinel involves the combination of a monoxide with a sequioxide, such as MgO plus $Al_2O_3$ yielding an unsaturated $MgAl_2O_4$, when combined in non-stoichiometric amounts as described below. Other complexing procedures involve a dioxide and two molecules of monoxide, such as $$2CaO + ZrO_2 = ZrCa_2O_4;$$

and a trioxide with a suboxide for example $$Cu_2O + WO_3 = WCu_2O_4.$$

It will be seen that substantially the same molecular structure results regardless of the particular forms of oxide combinations involved. These spinel type compounds can exhibit similarly unsaturated crystalline structures.

There are large numbers of other oxide complexes which fall into one of the types of oxide complexes noted above and which form spinel-type molecular structures. Some of these are noted in the following table:

TABLE 1.—TYPES OF SPINELS

| Type I, $MO \cdot N_2O_3$ or $MN_2O_4$ | | Type II, $2MO \cdot NO_2$ or $NM_2O_4$ | | Type III, $M_2O \cdot NO_3$ or $NM_2O_4$ |
|---|---|---|---|---|
| $MgAl_2O_4$ | $FeCr_2O_4$ | $TiMg_2O_4$ | $TaFe_2O_4$ | $MoCu_2O_4$ |
| $MgCr_2O_4$ | $NiCr_2O_4$ | $ZrMg_2O_4$ | $ZrNi_2O_4$ | $WCu_2O_4$ |
| $MgFe_2O_4$ | $CuCr_2O_4$ | $CbMg_2O_4$ | $ZrNi_2O_4$ | |
| $CaAl_2O_4$ | $ZnCr_2O_4$ | $TaMg_2O_4$ | $TaNi_2O_4$ | |
| $MnAl_2O_4$ | $CbCr_2O_4$ | $TiCa_2O_4$ | $CbZn_2O_4$ | $MoAg_2O_4$ |
| $FeAl_2O_4$ | $CdCr_2O_4$ | $ZrCa_2O_4$ | $TaZn_2O_4$ | $WAg_2O_4$ |
| $CoAl_2O_4$ | $CoFe_2O_4$ | $CbCa_2O_4$ | $ZrCb_2O_4$ | |
| $NiAl_2O_4$ | $MnFe_2O_4$ | $TaCa_2O_4$ | $ZnCd_2O_4$ | |
| $ZnAl_2O_4$ | $FeFe_2O_4$ | $TiMn_2O_4$ | $TaCb_2O_4$ | |
| $CbAl_2O_4$ | $NiFe_2O_4$ | $TiFe_2O_4$ | $TaCd_2O_4$ | |
| $CdAl_2O_4$ | $ZnFe_2O_4$ | $TiNi_2O_4$ | $UMg_2O_4$ | |
| $CaCr_2O_4$ | $MgV_2O_4$ | $TiCb_2O_4$ | $MCa_2O_4$ | |
| $CaFe_2O_4$ | $FeV_2O_4$ | $TiCd_2O_4$ | $UMn_2O_4$ | |
| $CoCr_2O_4$ | $ZnV_2O_4$ | $TiCo_2O_4$ | $UFe_2O_4$ | |
| $MnCr_2O_4$ | | $TiZn_2O_4$ | $UNi_2O_4$ | |
| | | $ZrMn_2O_4$ | $UZn_2O_4$ | |
| | | $CbMn_2O_4$ | $UCb_2O_4$ | |
| | | $TaMn_2O_4$ | $UCd_2O_4$ | |
| | | $ZrFe_2O_4$ | $VMg_2O_4$ | |
| | | $CbFe_2O_4$ | $VZn_2O_4$ | |

However, in order to be used for solid electrolytes one of the constituent oxides must be present in less than the stoichiometric amount to permit the formation of the ion transport defects in the crystalline lattice. For example, in the monoxide-dioxide spinel formation, such as $ZrCa_2O_4$, 15 mol percent of calcium oxide rather than the theoretical 66 percent is used, to produce an unsaturated spinel lattice. The unsaturating percentage of the stabilizing oxide will, of course, vary depending upon the particular oxide complex which is used.

Complex oxide combinations can be employed other than typically spinel-type structures. For example, an oxide complex formed from a dioxide and a sequioxide, such as $ThO_2 + Y_2O_3 = ThY_2O_5$, exhibits electrolytic properties in the non-stoichiometric condition. The essential requirement of the electrolytic complex oxide combination is that one of the complexing oxides be present in a non-stoichiometric amount to provide the necessary crystalline lattice defects (oxygen vacancies) and resulting oxygen ion transference. By this mechanism the unsaturated oxide complex, from which the mass 52 or 52' is formed, develops an EMF equivalent to the differential in oxygen concentration at the apposed sides or surfaces thereof. A suitable meter can be calibrated to read the EMF output of the probe in terms of oxygen concentrations in the material whose oxygen content is unknown at one side of the mass. Such calibration of course will be related to a given known oxygen concentration at the other mass side.

FIG. 4 of the drawings is a logarithmic graph showing the variation of probe EMF in millivolts with concentration of dissolved oxygen in parts per million. The illustrated curves, for various types of oxygen-reference materials were obtained in molten steel at 2900° F. The least desirable of these reference materials is air, as denoted by curve 110, which exhibits relatively high voltage requiring special instrumentation and in some cases causing the electrolyte to break down. Curve 112, representing the use of $CO_2$ is of special interest, on the other hand, owing to its substantially greater slope and lower voltage.

Except as provided by my invention, the use of $CO_2$ or other gaseous material as an oxygen reference entails the continuous circulation of the gas through the probe structure. I avoid such continuous circulation while preserving the advantage of a higher

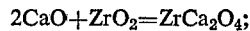
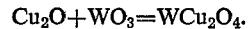

characteristic from the use of a $CO_2$ reference, with the self-contained feature of FIG. 6 or 7 described as follows:

A number of cerment-like materials for example Ni—NiO, Fe—Fe$_x$O, Cr—Cr$_2$O$_3$, W—WO$_2$, Co—CoO, Cb—CbO, Mo—MoO$_2$, and various other oxidizable metals and their oxides have been proposed for use with known solid electrolyte structures. These cermets, which desirably contain a preponderance of free metal for the purposes of the present invention, are especially advantageous when used in my novel probe structure, as their electrical conductivities permit electrical contact with the mass 52 therethrough. To qualify for such usage, the cermet including the free metal and its oxide must be sufficiently refractory at the anticipated operating temperature range of the liquid metal or other material to be measured. There must be no undue vaporization of the oxide but there must be a discernible equilbrium oxygen-pressure at the operating temperature range.

The EMF's obtained with some of these materials are represented by curves 114, 116 and 118. The Ni—NiO and Fe—Fe$_x$O curves 114, 116 are satisfactory for certain applications. However, the Cr—Cr$_2$O$_3$ curve 118 crosses the zero EMF line at point 120 with the result that concentrations of dissolved oxygen in the range of 20–50 p.p.m. are very difficult to measure. These and other oxygen-reference materials can be utilized, including the disclosed oxygen-reference means described below.

I have found that the addition of a dissimilar metal to the aforementioned cermet-like materials displaces the EMF curve, as typified by curve 122 for the oxygen-reference material, NiCr—Cr$_2$O$_3$. This material which is a combination of nichrome and chromium oxide displaces the undesirable curve 118 to the left and away from the zero EMF line 124. The curve 122 has the additional advantage that the EMF varies directly with dissolved oxygen concentration. The calibrational curves of the other cermet materials can be similarly displaced. It appears that a more noble metal shifts the EMF curve as a function of the activity of the diluent metal.

In FIG. 5 of the drawings, another arrangement 126 of my novel direct measurement apparatus is shown. In this example, oxygen measuring probe 128 is inserted through a refractory holder 130. The probe 128 and the block 130 are supported by a length of steel or other metal tubing 132. A small mass of solid electrolyte 136 is sealed into an insulating tube 128 of the proble structure 138 by one of the methods described above.

A combined electrode and oxygen-reference member including in this exemple of relatively pure foil 140 of an oxidizable metal is supported against the inner surface 142 of the electrolyte 136. The member 140 can be backed up by a metal foil or disc 144, or other noble metal. Electrical contact is made with a length of conductive wire 146 which can be made of platinum. The wire 146 is supported at the other end of the insulating tube 138 by means of refractory cement 148. If desired, a suitable insulating tube, as in FIG. 6, can be used to press the wire 146 against the member 144 if used and the electrode oxygen reference member 140 or similar metallic member and in turn against the adjacent surface 142 of the electrolyte 146. I have found that such pressure is sufficient to establish proper electrical contact between the lead 146 and the solid electrolyte 136.

The small bit of foil or other member 140, which can be made from an oxidizable metal such as iron, chromium, nickel, cobalt, molybdenum, tungsten or columbium, provides the oxygen based reference material for the proper operation of the electrolyte cell. Thus, a small amount of air or other form of gaseous oxygen contained within the interior 150 of the probe 128, is sufficient to form a very thin layer of oxide on the member or foil 140. The amount of the oxide layer is increased by the passage of oxygen ions through the solid electrolyte 136 when the probe 126 is immersed. I have found that the amount of oxide thus formed within the envelope 128 is sufficient to attain an equilibrium and reproducible EMF reading. The addition of a more noble but oxidizable dissimilar metal to the reference foil or member 140 likewise shifts the calibrational EMF curve as shown in FIG. 6. For example a disc 140 formed from Nichrome shifts the calibration curve to the left relative to the curve for a pure chromium disc 140, after the manner illustrated in FIG. 4.

A layer or tube of protective cardboard 142 or other refractory material surrounds the outer surfaces of at least that part of the supporting tube or holder 132 which may be immersed in the molten metal bath or the like. The exposed surface 154 of the electrolyte 136 is protected during its passage through any slag or other overlying layer on the bath or heat by means of a suitably shaped cap 156, which can frictionally engage the adjacent end of the cardboard layer 152. For use with molten steels, the cap 156 can be fabricated from a mild steel which is quickly melted to expose the electrolyte surface 154 at some point or predetermined location beneath the surface of the steel bath.

As mentioned in certain of the preceding figures, it will be understood, of course, that a second lead (not shown in FIG. 5) can be introduced into the insulating tube or envelope 128 for the purpose of making a thermocouple connection at the electrode member 140 or 144. It is also contemplated that the electrode and reference member 140 can be replaced with a mixed metal or alloy member such as a piece of nichrome. As set forth in FIG. 4, I have found that the use of a Nichrome foil displaces the EMF calibration curve to a more favorable position (curve 122) relative to that obtained with chromium (curve 118). Similar alloys can be employed to fabricate the member or foil 140 to displace the various calibration curves more or less at will.

In construction of the probe 126 of FIG. 5 it is not necessary that the member or foil 140 be sufficiently refractory to withstand melting at the operating temperatures of the probe 126. For example, I have obtained equally good results from the use of a pure iron foil 140 or other metal which melts within the operating temperature range of most liquid steels. For this reason, the foil or other oxidizable metallic member 140 can be provided in the form of particulate or pulverulent material.

Carbon or graphite can be substituted for the oxygen-reference means 140 after the teaching of FIG. 5. It is also contemplated that a suitable electrically conductive and self-contained oxygen reference material such as cermet, can be substituted for the member 140. The cermet, which can be selected from those materials enumerated or characterized in connection with FIG. 4, is provided as a suitable member or mass positioned against and hence in electrical contact with the solid electrolyte mass 52. The cermet, for this purpose, therefore can be provided in the form of a foil or other descrete member, or as a pulverulent mass. Either form may be pressed against the solid electrolyte 52 as by use of the contact foil or disc 144 or similar contact, or, operating conditions permitting, by gravity. Where the mass of reference material 140 is a discrete member and is sufficiently refractory to withstand melting at the anticipated operating temperatures the contact member 144 can be omitted and electrical contact made directly to the reference member 140.

Figure 7:
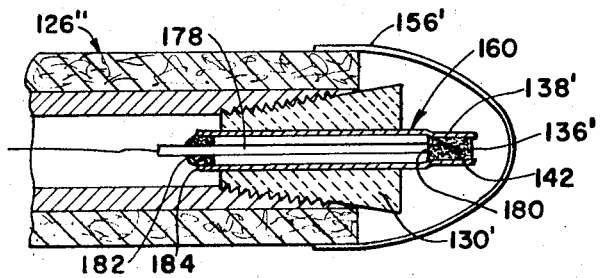
FIG. 7 is a similar view of another form of my novel probe structure having a combined electrode, electrode lead and oxygen-reference material within the probe structure.

In FIGS. 6 and 7 I provide convenient means for generating carbon dioxide (CO$_2$) within the probe structure as an oxygen-reference material. The desirability of using CO$_2$ has been established in connection with FIG. 4. As explained more fully hereinafter the probe structure 158 of FIG. 6 can be partially closed, while the probe structure 160 of FIG. 7 is closed but not sealed. The probe structures 158, 160, as in the case of the structure 128 of FIG. 5, can be employed as part of the measuring apparatus 126 or 126' (FIGS. 5 and 6). The probe support 126 may be plunged manually into the molten steel bath or the like, with the provision of a probe support 126 of suitable length, for example, as used in connection with a conventional immersion thermocouple. It is also contemplated that an emersion gun structure can be used.

With more particular reference to FIG. 6, the solid electrolyte 136' is supported in insulating tube 138' in the manner described previously. Electrical contact can be established with the inner surface 142' of the electrolyte 136' by means of a conductive wire lead 162 or the like. Electrical contact between the wire lead 162 and the electrolyte surface 142' can be established as shown in FIG. 1. However, I have found, in most cases, that the platinum or other metallic coating can be omitted from the surface 142', and adequate electrical contact can be made between the electrical lead and the electrolyte by merely pressing these components together. In one arrangement, this is accomplished as shown in FIG. 7 by forming an enlarged contact portion 164 adjacent the inner end of the lead 162. An inner insulating tube 166 is then furnished for the purpose of engaging and pressing the spiral 164 into firm contact with the electrolyte surface 142'. Alternatively, the lead is simply bent over the inward end of the inner tube 166. This engagement is preserved by securing the adjacent surface of the inner tube 166 to the other end of the probe tube 138' by means of a refractory cement 168. Alternatively the inner end of the lead can be embedded in the electrolyte mass, particularly when the latter is supplied as a bit of pulverulent material.

In further accordance with my disclosure of FIG. 6, I provide a solid oxygen reference material 174 preferably within the space 172 between the inner or lead supporting tube 166 and the outer electrolyte supporting tube 138'. The material 174 is conveniently coated on the outer surfaces of the inner tube 166 and is capable of releasing an oxygen reference gas at elevated temperatures for the proper operation of the electrolyte cell 136'. As an example of such material 174, I use magnesium carbonate (MgCO₃) or manganese carbonate (MnCO₃), or preferably calcium carbonate (CaCO₃), which decompose to release carbon dioxide (CO₂) at the respective operating temperature of the probe 158. In this arrangement, the outer end 170 of the inner tube 166 is left open. As the material 174 decomposes, the liberated CO₂ or other oxygen reference gas travels toward the electrolyte 136' and comes into intimate contact with the inner surface 142' thereof, owing to the close proximity of the inner end 176 of the inner tube 166. For use in measuring the dissolved oxygen content of liquid steels, the inner insulating tube 166 desirably is fabricated from fused silica or quartz or alumina as is the electrolyte supporting tube 138'. The probe structure 158 is not sealed, and it possesses the advantage of producing a very quick, equilibrium reading, owing to the copious supply of CO₂ from the decomposition of the rather limited quantity of material 174. A more obvious advantage is, of course, the elimination of an external source of CO₂ and its attendant conduit connections, metering valves, etc.

A similar measuring apparatus 126" is shown in FIG. 7. The probe structure 160 used therein incorporates the advantageous use of CO (in the presence of carbon) to provide an oxygen reference within the probe. The inner surface 142' of the solid electrolyte is contacted by combined electrode, electrode lead, and oxygen reference member 178. In this example the member 178 is a carbon or graphite rod extending substantially through the insulating tube 138' and is pressed at its inner end 180 to contact with the inner surface 142' of the electrolyte 136'. This relation, which produces adequate electrical conductivity between the electrode 178 and the electrolyte 136', is maintained by a rigid portion 182 of refractory cement or the like, positioned between the outer end 184 of the electrolyte supporting tube 138' and the adjacent surface of the electrode 178. The cement 182, however, can be porous or otherwise provided with a passage for the escape of air or gas when the probe 160 is heated.

When the other end, i.e., the electrolyte end of the insulating tube 138' is plunged into a bath of molten metal, the adjacent end 180 of the electrode 178 naturally attains the highest temperature along its length. At this time, the end portion 180 of the electrode quickly combines with air or oxygen contained within the insulating tube 138' to form carbon monoxide (CO) to yield a standard oxygen reference base for the probe 160. Thus, different forms of oxygen reference means are produced in accordance with the following equilibrium reaction:

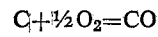

$$C + \tfrac{1}{2}O_2 = CO$$

It is also contemplated that the rod can be made of other conductive and oxidizable or partially oxidized materials, to provide differing characteristics of the combined electrode, oxygen reference means, and electrical lead or conductor. Thus, the rod 178 can be fabricated with any of the cermet materials enumerated or characterized in connection with FIG. 4 or in connection with the conductive, oxygen-reference mass or member 140 of FIG. 5.

Figure 8:
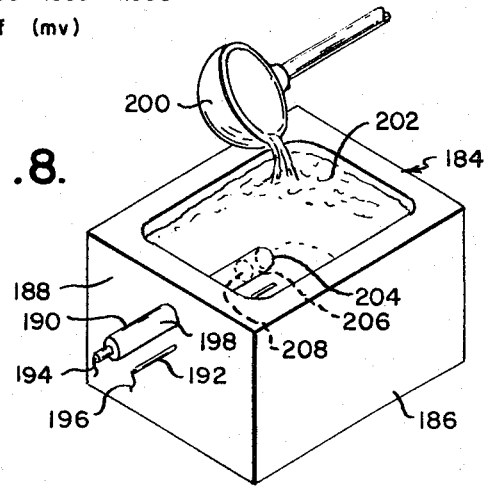
FIG. 8 is an isometric view of still another form of my direct oxygen measurement apparatus.

Another novel arrangement of my direct oxygen measuring apparatus 184 is shown in FIG. 8. The apparatus includes a refractory mold structure 186 through a wall section 188 of which are inserted an oxygen probe 190 and electrode 192. The probe 190 can be constructed in accordance with the insulating tube and electrolyte assembly shown in any of the preceding figures. Desirably the probe 190 is one of the self-contained probe structures 128, 158, or 160 of FIGS. 5–7 for ready portability of the measuring apparatus 184. Suitable electric leads 194, 196 are connected to the probe 190 and to the exterior electrode 196 and thence to external EMF measuring circuitry (not shown) of known construction. Although the material of the mold 186 is of an insulating character it is not necessary, of course, to provide any particular means of insulating the electrode 192 from the probe structure 190, owing to the use of an insulating supporting tube 198.

In the operation of the direct measuring apparatus 184 a quantity of molten steel or other material having a temperature of at least 800° C. and desirably 1000° C. or higher is poured into the mold 186 from a suitable ladle or spoon 200. The mold 186 is filled until the surface 202 of the molten material covers the probe 190 and the electrode 192. Electrical contact is established with the outer surface 204 of the solid electrolyte mass 206 through the molten steel 202 or the like and the external electrode 192. On the other hand, the inner surface 208 of the electrolyte mass 206 is contacted by means of the electrical lead 194. As noted below respecting FIG. 9 a thermocouple can be associated with the probe 190 in FIG. 8 for correlation with the EMF reading of the probe 190. Desirably the probe EMF is measured at the solidification temperature of the liquid metal, as denoted by the temperature thereof becoming essentially constant. In the case of liquid steel, the melting temperature of specific alloys thereof can be quickly determined along with percentages of certain constituents such as carbon. The constant or freezing temperature thus obtained can be correlated with the EMF of the probe to determine oxygen content.

Figure 9:
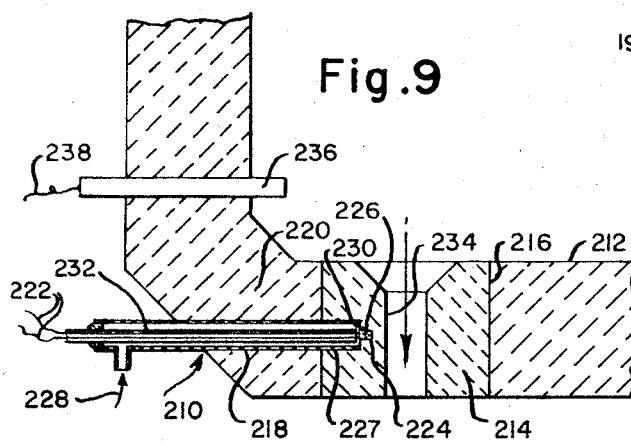

In FIG. 9 another modification 210 of my novel direct measuring apparatus for dissolved oxygen is disclosed. In this arrangement my apparatus is incorporated in a tundish 212 of a continuous casting machine, or in other suitable container structure, and is thereby enabled to perform a continuous monitoring of the oxygen content in the liquid steel passing through the tundish. Specifically I provide a stabilized zirconia (CaO.ZrO₂) insert 214 for one or more of the nozzle openings, such as the opening 216 of the tundish 212. One of the other solid electrolyte materials listed above can be substituted for the stabilized zirconia, provided its melting or softening point is above the anticipated temperature of the liquid steel.

The electrolyte insert 214 is contacted with an external measuring circuit and with an oxygen reference material to complete the electrolyte cell establishd by the insert 214. One arrangement for establishing such contact includes the provision of an insulating tube 218 extended through a conventional refractory wall structure 220 of the tundish 212. In this arrangement, a pair of electric leads 222 are extended through the insulating tube 218 and terminate in a thermocouple connection 224, which in turn is closely fitted into an adjacent recess 226 of the electrolyte insert 214 for electrical and thermal contact therewith. Alternatively, the thermocouple can simply be pressed against the bottom of the tube recess 227 in the insert 214.

Suitable oxygen reference material such as air or $CO_2$ from a suitable external source (not shown) can be conducted through the insulating tube 218 as denoted by flow arrow 228 to the inner end 230 of the insulating tube 218 where the reference gas contacts the adjacent surface of the electrolyte insert 214. The reference gas can then be conducted out of the insulating tube 218 through in inner tube 232 surrounding the leads 222. As noted below, other oxygen reference means can be substituted.

Electrical contact with the inner surface or throat 234 of the electrolyte insert 214 is established through the liquid steel in the tundish 212 and through any metallic component of the continuous casting machine which is in contact with the liquid steel. To facilitate such contact an external electrode 236 can be sealed through the wall structure 220 of the tundish 212 or inserted directly into the liquid metal through the open top of the tundish.

With this arrangement, an oxygen reference material can be continuously supplied to one side of the electrolyte insert 214 and a material of unknown oxygen content to the other side. The EMF developed thereacross is continuously monitored by measuring the potential developed across external electrode lead 238 and one of the thermocouple leads 222. Owing to the rapid response of the direct measuring apparatus 210, a continuous reading of the dissolved oxygen content of the liquid metal passing through the electrolyte insert 214 can be obtained. Such readings can be calibrated against any changes of temperature, which are of course continuously indicated by the thermocouple 224. It will be appreciated that other suitbale oxygen-reference means, such as one of those described above, can be substituted depending upon the specific application of the invention.

Figure 10:
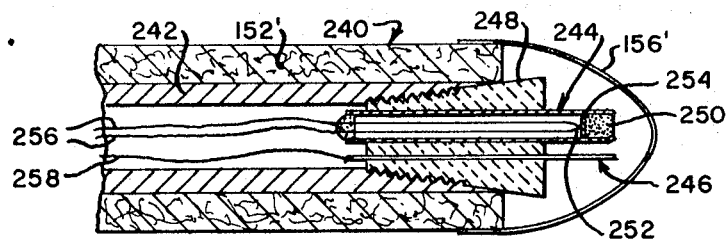
FIG. 10 is a partial longitudinally sectioned view similar to FIG. 7 and showing a modified probe structure.
Figure 11:
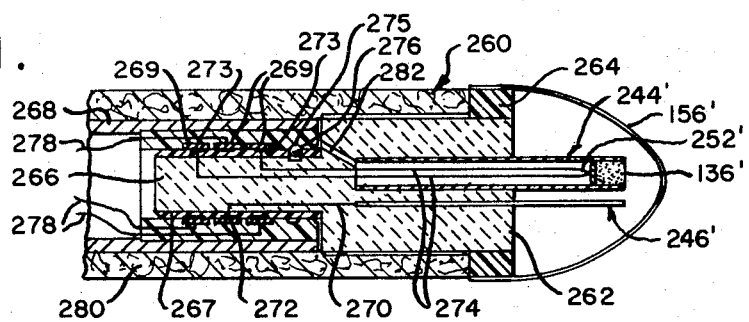
FIG. 11 is a similar view of still another form of my probe structure.

In FIG. 10 of the drawings there is disclosed another form 240 of my novel probe structure which can be immersed or submerged below the surface of a liquid metal bath for simultaneously measuring the temperature and the dissolved oxygen content of the metal bath. The supporting tubing 242 as noted above in connection with FIG. 5 can be of any desired length for insertion manually lance-wise or with an ejection device into the metal bath. The tube 243 is protected in this example by a thermally insulating jacket 152' to which is fitted a protective cap 156'. Alternatively the cap 156' can be engaged with the plug 248 or other common support for the probe and external electrode. A direct reading oxygen probe 244 and an external electrode 246 such as a rod of steel or other compatible conductive material are inserted through suitable openings therefor in a refractory plug 248. In this example, the plug 248 can be secured to the end of the supporting tube 242 after the manner of FIG. 5.

A mass of electrolyte 250 is maintained within the exposed end of the insulating envelope 244 as described previously. The probe structure 244 can be fabricated as described in connection with any of the preceding figures, and, in this example, is provided with a thermocouple 252 positioned against an oxygen reference member 254 and the inside surface of the mass 250. Thermocouple and electrolyte leads 256 are extended through the interior of the envelope 244. As in other figures of the drawings, the refractory cement at the end of the envelope 244 merely stabilizes the leads 256 but does not seal the envelope. A similar lead 258 is connected to the external electrode 246, and all of the leads 256, 258 are extended through the supporting tube 242 for connection to external EMF measuring circuitry (not shown). With the arrangement of FIG. 10 both the probe structure 244 and the external electrode 246 can be immersed beneath the surface of a liquid metal bath to the same predetermined depth, for measuring the dissolved oxygen content at that location. Substantially at the same time, the temperature at that location can be measured through the thermocouple 252.

A similar immersion and direct-reading probe 260 is shown in FIG. 13. In this arrangement the probe 244' and external electrode 246' are supported by a refractory block or plug 262. At the forward end of the plug 262 the protective cap 156' is engaged as in preceding figures. As noted previously the cap 156 or 156' can be used to prevent contact of the probe 244' with any overlying slag. By the same token, the cap 156 or 156' can be employed to prevent contact with the liquid metal until the forward ends of the probe and electrode can be immersed to a predetermined depth below the surface of the liquid metal.

In this example the refractory block 262 is provided with a necked down portion 266 covered with an insulating layer 267 to which is secured an elongated supporting tube 268. Desirably, the supporting tube 268 is fabricated from a suitable structural material and is provided with longitudinally spaced commutator rings 269. The external electrode 246 is connected through lead 270 to contact 272 extending through the insulating layer 267, which can be of polyvinyl acetyl or the like for engagement with one of the commutator rings 269.

A pair of additional leads 274 for the thermocouple 252' are extended through the plug 262 to similar contacts 273 which are longitudinally spaced along the plug neck 266 for respective engagement with the remainder of the commutator rings 269.

The plug 262 together with the probe 244' and electrode 246', can be snapped into the supporting tube 268 by groove and detent means 275, 276. When thus engaged, the contacts 272, 273 are respectively engaged with the commutator rings 269, irrespective of the rotated position of the plug relative to the supporting tube 268. The rings 269 are connected to suitable leads 278 extended through the supporting tube 268. At least the forward end of the tube 268 is afforded a protective layer 280 of cardboard or the like such as a ceramic material. Desirably the length of the insulation 280 is at least equivalent to the thickness of an overlying slag layer (not shown) on a melt of liquid metal. Preferably, however, the length of insulation 280 exceeds such minimal length as the probe may be inserted to more than a minimal depth below the slag layer.

A suitable vent 282 is provided to relieve internal pressures when the probe 260 is heated.

From the foregoing it will be apparent that novel and efficient forms of methods and means for determining oxygen content of materials have been described herein. While I have shown and described certain presently preferred embodiments of the invention and have illustrated presently preferred methods of practicing the same it is to be distinctly understood that the invention is not limited thereto but may be otherwise variously embodied and practiced with the spirit and scope of the invention.

I claim:

1. A method for fabricating a direct reading oxygen probe structure capable of being plunged into liquid metal such as liquid steel without destructive thermal shock, said sensor being capable of determining the dissolved oxygen content of liquid metals at high temperatures, said method comprising the steps of inserting a relatively closely fitting small mass of an oxygen-ion permeable solid electrolyte material into one end of an elongated insulating refractory envelope, and heating said envelope at a sintering temperature of said mass for a time sufficient to sinter and mutually seal the interface of said mass to said envelope.

2. The method according to claim 1 wherein said mass and said envelope are of sufficiently small size as to be capable of withstanding thermal shock upon contacting said metal, and further including shaping said mass so as to fit relatively closely within one end of said envelope.

3. The method according to claim 1 wherein said envelope is heated to a softening temperature thereof which is also within a range of sintering temperatures of said mass to facilitate sealing said mass to said envelope.

4. The method according to claim 1 further including rotating said envelope about its longitudinal axis during said heating.

5. The method according to claim 1 wherein said mass is inserted into said envelope in pulverulent form, and wherein said heating sinters particles of said mass to one another and sinters the outer periphery of said mass to the adjacent surfaces of said envelope.

6. The method according to claim 5 further including mixing said pulverulent mass with a binder, and preliminarily heating said envelope to drive off said binder and to compact said pulverulent mass.

7. The method according to claim 1 wherein said envelope is heated to a temperature within a range of about 2000° F. to about 3000° F.

8. The method according to claim 1 wherein said electrolyte is one of the group consisting of zirconia stabilized with calcia and thoria stabilized with yttria.

9. The method according to claim 1 wherein said electrolyte has a larger coefficient of thermal expansion that of said envelope, and wherein said envelope is heated from about room temperature to a point near its softening temperature before an appreciable thermal expansion of said mass occurs.

10. The method according to claim 1 further including rapidly cooling said envelope and said mass from sintering temperature following said heating to stabilize said seal.

11. The method according to claim 10 wherein said envelope and said mass are of materials respectively including oxides which form an interfacial compound when sintered.

12. The method according to claim 11 wherein said oxide compound is a spinel configuration.

13. The method according to claim 11 wherein said oxide compound is a silicate.

14. The method according to claim 13 wherein said silicate is calcium silicate.

15. The method according to claim 1 wherein said envelope is of an electrically insulating material characterized as being sufficiently refractory and chemically resistant to withstand molten metal for an interval at least sufficient to permit a reading to be made.

16. The method according to claim 1 wherein said envelope is of a material containing a member selected from the group consisting of alumina, fused silica and fused quartz.

17. The method according to claim 1 wherein said envelope is of a material comprising alumina.

18. The method according to claim 1 wherein said envelope is of a material comprising fused silica.

19. The method according to claim 1 wherein said envelope is of a material comprising fused quartz.

20. The method according to claim 1 wherein said envelope is of a material consisting essentially of alumina.

21. The method according to claim 1 wherein said envelope is of a material consisting essentially of fused silica.

22. The method according to claim 1 wherein said envelope is of a material consisting essentially of fused quartz.

References Cited
UNITED STATES PATENTS

| | | | |
|---|---|---|---|
| 3,400,054 | 9/1968 | Ruka et al. | 204—1 T |
| 3,404,036 | 10/1968 | Kummer et al. | 136—153 |
| 3,410,780 | 11/1968 | Holden | 204—195 S |
| 3,468,780 | 9/1969 | Fischer | 204—195 S |

OTHER REFERENCES

Horsley: "AERE Report R3427," United Kingdom Atomic Energy Authority, 1961, pp. 1-11 and Fig. 2.

TA-HSUNG TUNG, Primary Examiner

U.S. Cl. X.R.

204—1 T; 264—56, 109